(12) United States Patent
Tandart

(10) Patent No.: US 7,128,560 B2
(45) Date of Patent: Oct. 31, 2006

(54) EXPANSION TOOL DEVICE FOR SOCKET PLIERS

(75) Inventor: Jean-Marie Tandart, Epernay (FR)

(73) Assignee: Virax S.A., Epernay (FR)

( * ) Notice: Subject to any disclaimer, the term of this patent is extended or adjusted under 35 U.S.C. 154(b) by 0 days.

(21) Appl. No.: 10/484,961

(22) PCT Filed: Aug. 1, 2002

(86) PCT No.: PCT/FR02/02776

§ 371 (c)(1),
(2), (4) Date: Jul. 6, 2004

(87) PCT Pub. No.: WO03/011496

PCT Pub. Date: Feb. 13, 2003

(65) Prior Publication Data

US 2004/0253340 A1    Dec. 16, 2004

(30) Foreign Application Priority Data

Aug. 1, 2001  (FR) .................................. 01 10319

(51) Int. Cl.
B29C 57/04 (2006.01)

(52) U.S. Cl. ...................... 425/392; 425/393; 425/467; 425/DIG. 218; 72/393

(58) Field of Classification Search ................ 425/392, 425/393, 466–468, DIG. 218; 72/392, 393
See application file for complete search history.

(56) References Cited

U.S. PATENT DOCUMENTS

| 3,888,102 A | | 6/1975 | Nigido | |
|---|---|---|---|---|
| 4,034,591 A | * | 7/1977 | Rothenberger | ............... 72/393 |
| 4,107,249 A | * | 8/1978 | Murai et al. | ....... 425/DIG. 218 |
| 4,888,975 A | * | 12/1989 | Soward et al. | ................ 72/392 |
| 5,744,085 A | * | 4/1998 | Sorberg | ..................... 425/393 |

* cited by examiner

Primary Examiner—Yogendra N. Gutta
Assistant Examiner—Thu Khanh T. Nguyen
(74) Attorney, Agent, or Firm—Egbert Law Offices

(57) ABSTRACT

An expansion tool device for pliers used for producing sockets at the ends of pipes made of plastic material or the like used in plumbing systems, includes a cylindrical end piece formed by the closure of several sector-shaped jaws radially mobile under the action of a conical needle operated with pliers and adapted to be axially inserted in a conical recess. It also includes an insert axially mobile between the jaws, and designed to receive the conical needle when the tool is fixed to the pliers, the insert having one end for receiving the conical needle, while its other end has a conical shape adapted to the conical recess of the jaws, the conical parts having substantially identical coning angles, but of different diameters.

3 Claims, 1 Drawing Sheet

EXPANSION TOOL DEVICE FOR SOCKET PLIERS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to an expansion tool device for pliers used for producing sockets at the ends of pipes made of plastic material or the like, used in the field of plumbing.

BACKGROUND OF THE INVENTION

In plumbing, pipe joints made of plastic material or the like are made using metal fittings onto which the pipes are inserted. The ends of the pipes are previously widened by means of socket pliers provided with an expansion tool.

After the socket is made, the pipe is immediately inserted onto the fitting and, due to the elastic properties of the plastic material, the pipe tends to resume its initial shape and fits tightly around the fitting, which is sufficient for their making integral, which is however completed by the presence of a widened external collar and at the same time as the end of the pipe.

A socket on a pipe made of plastic material is not made quite in the same way as a socket on a pipe made of annealed copper. One should indeed widen enough the end of the pipe in order to allow the insertion before the recovery of the shape, yet avoiding the creation of a plastic distortion instead of an elastic distortion.

Furthermore, for obvious reasons of strength, the thickness of the pipe wall increases with its diameter, and the more the thickness increases, the quicker the elastic return occurs, which requires a more considerable widening.

As well known, socket pliers, traditionally used for making sockets in pipes made of annealed copper, comprise, on the one hand, an expansion tool including a cylindrical end piece formed of the closure of several sector-shaped and radially mobile jaws and, on the other hand, a conical needle axially moveable by operating two arms, capable of being inserted between said jaws, in a conical recess, in order to cause them to spread apart, the restoring into the initial position occurring through elastic means. Advantageously, the tool is detachable from the pliers, which allows to adapt on the latter the tool corresponding to the diameter of the pipe to be widened and, therefore, to use the same pliers for several diameters.

It should be noted that the pliers can be operated manually or motorized through hydraulic means, for example.

These socket pliers have however limitations, in particular as regards pipes made of plastic material of a large diameter, for example in the range of 40 mm. In order to make a socket on such a pipe, which requires that the widening diameter exceeds the nominal diameter by about 50%, it is necessary to use a special technique as well as an expansion tool having specific features. It is indeed not possible to complete the widening in one single operation, on the one hand because of the force required, on the other hand due to the amplitude of the widening to be made and that, limited, of the displacement of the jaws, and, yet on the other hand, in order to avoid the creation of a plastic distortion.

Therefore, one proceeds to a succession of widening operations together with a progressive penetration of the end piece into the pipe. In order to implement this technique, the end piece has a slightly conical extreme portion that is aimed at being progressively inserted into the pipe.

Frequent cases of leaks have however been found on sanitation installations using pipes made of plastic material of a large diameter, said leaks being caused by sockets of an uneven shape.

Actually, during the first steps of the widening operation, only the end of the tool is acting and, because of the offset of the stress with respect to the action of the conical needle, the jaws bend and are positioned irregularly with respect to each other, thus creating local plastic distortions of the material, which are prejudicial to the elastic recovering and therefore to the tightness of the integral connection.

One could contemplate using specific tools associated to particular pliers, i.e. including a needle of more considerable dimensions, which however disadvantageously constrains the user to multiply the number of necessary pliers.

In order to try to cope with this disadvantage, an adapter device has been provided in FR 2,300,638, aimed at being mounted, as an intermediate part, onto pliers and at receiving an expansion tool. This adapter includes, internally, a member capable of being inserted between the conical needle and the jaws of the expansion tool, it includes for this purpose an end having a conical recess aimed at co-operating with the conical needle of the pliers and, at its other end, it has a conical shape aimed at co-operating with the conical recess of the jaws of the tool, the coning angles being identical, but the diameters being different.

It is therefore possible to choose the adapter device corresponding to the tool one wants to use. However, this device does not allow to fully solve the problem raised, in that, apart from the need for the user to have several adapters and, therefore, to have to transport them to the working site, said user has to regularly change the adapter according to the diameter of the pipe to be widened, being constrained to verify each time whether said adapter fits the tool to be used. In fact, this device corresponds to the above-mentioned solution, i.e. having to use several pliers.

It would be quite possible, in order to avoid using several adapters having different dimensional characteristics, to provide one single adapter having average dimensional characteristics, so that a large number of tools can be adapted thereto, which disadvantageously results into a work far from being optimal for the majority of diameters used.

BRIEF SUMMARY OF THE INVENTION

This invention aims at coping with these various disadvantages by providing an expansion tool device for pliers used for producing sockets at the ends of pipes made of plastic material or the like, used in the field of plumbing, allowing the user to be obliged to have only one single pair of pliers, irrespective of the diameter of the pipes to be widened.

The expansion tool device for pliers used for producing sockets at the ends of pipes made of plastic material or the like, used in the field of plumbing according to the invention, is of the type comprising a cylindrical end piece formed by the closure of several sector-shaped jaws that are radially mobile under the action of a conical needle operated with pliers and capable of being axially inserted between said jaws in a conical recess, and it is mainly characterized in that it comprises an insert axially mobile between said jaws, and aimed at receiving the conical needle of said pliers when the tool is fixed to the latter, said insert comprising an end having a conical cavity aimed at co-operating with said conical needle, while its other end has a conical shape adapted to the conical recess of said jaws, the conical portions of said ends having substantially identical-coning angles, but of different diameters.

The insert creates an extension of the conical needle that penetrates deeper between the jaws, thus allowing to conduct the displacement of the latter, even at the level of their end throughout the expansion operation. It is therefore possible, even if the end piece is of a considerable width, to create a deeper internal conical cavity in the latter, thus allowing that said jaws be, over their full length, in contact with the insert.

Advantageously, the end piece has a slightly frustoconical extreme portion.

According to a particular embodiment of the device according to the invention, it comprises a bushing holding the sector-shaped jaws forming, through their closure, a cylindrical end piece having, internally, an axial conical recess, said jaws being moveable in radial displacement and restored by springs, while an externally conical insert, accommodated in said conical recess and held in said bushing, is axially mobile in the latter and has an internal conical cavity capable of receiving the conical needle of socket pliers, the external conical profile and said internal conical cavity having the same coning angle.

The advantages and the features of the device according to the invention will become clear when reading the following description referring to the attached drawing, which represents a non-restrictive embodiment thereof.

DETAILED DESCRIPTION OF THE INVENTION

Figure 1:
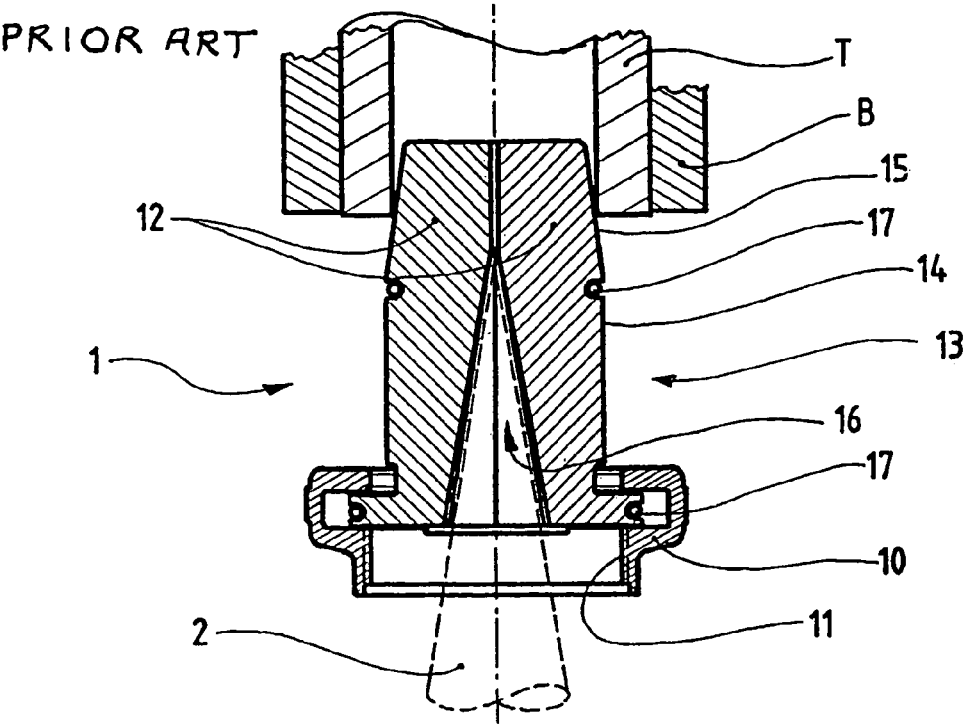
FIG. 1 shows a schematic axial cross-sectional view of an expansion tool device of a well-known type.

Referring to FIG. 1, one can see an expansion tool device 1 of a well-known type, for producing sockets in a pipe T made of plastic material, the end of which is generally provided, externally, with a collar B. The tool device 1 includes a bushing 10 having an internal thread 11 for being adapted onto pliers, not shown, and holding jaws 12, generally six in number, of a sector-shaped transversal section, so that their closure forms a cylindrical end piece 13. The working surface 14 of the end piece 13 is not completely cylindrical, its extreme portion 15 being slightly conical in order to allow its insertion into the end of the pipe T to be widened.

The end piece 13 has, internally, a conical recess 16 resulting from the hollowing out of the internal side of each jaw 12, and which is aimed at receiving the conical needle 2, shown by a dashed line, of the socket pliers, not shown.

The jaws 12 are freely moveable in radial direction, held by the bushing 10 and they are restored by two peripheral springs 17.

It is obvious that an axial displacement of the conical needle 2, in the direction of its penetration into the conical recess 16, causes a proportional radial displacement of the jaws 12, and therefore an increase of the diameter of the end piece 13.

The coning angle of the needle 2 and of the recess 16 is chosen in order to, on the one hand, allow a sufficient widening amplitude according to the stroke of the needle 2 and, on the other hand, a sufficient reduction of the stress to be applied. A very thin needle 2 would indeed allow a great reduction of the stress, but would require a considerable stroke in order to achieve the desired widening amplitude, the more one has to produce a socket in a pipe T made of plastic material. Furthermore, a needle 2 of a larger angle would allow to increase the widening amplitude to the detriment of the easiness of operation.

In the case of producing a socket in a pipe T made of plastic material, due to the widening amplitude and to the limitation of the expansion of the jaws 12 related to the conicity and the stroke of the needle 2, the diameter of the end piece 13 is slightly greater than the internal one of the pipe T, hence the presence of the extreme portion 15 allowing the initiation of the widening until the end piece 13 is fully inserted.

It is obvious, furthermore, that the length of the end piece 13 is also related to the diameter of the socket to be produced, so that, in the case of the embodiment shown, upon initiation of the widening, the conical portion 15 of the end piece 13 is partially inserted into the pipe T to be widened, and the resistance stress is transferred onto the ends of the jaws 12, while their displacement is caused by the needle 2 essentially at the level of the opening of the recess 16, which causes an irregular spreading apart of the jaws 12 from each other and therefore an uneven distortion of the pipe T.

Figure 2:
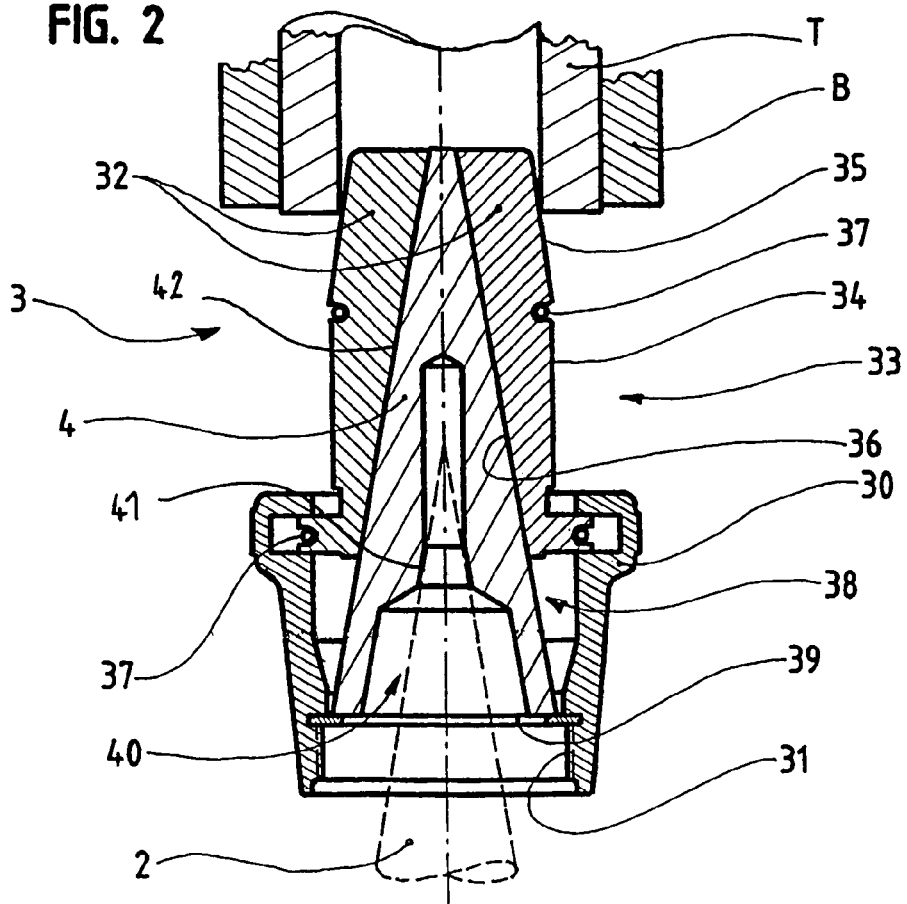
FIG. 2 shows a schematic axial cross-sectional view of an expansion tool device according to the invention.

Referring now to FIG. 2, one can see an expansion tool device 3 according to the invention. The latter includes similarly a bushing 30 provided with an internal thread 31 and holding the sector-shaped jaws 32 forming by their closure an end piece 33 the working surface 34 of which includes a conical extreme portion 35 having, internally, a conical recess 36, the jaws 32 being moveable in radial displacement and restored by springs 37.

According to the invention, the tool 3 contains an insert 4 situated in the recess 36, axially mobile in the bushing 30 that includes for this purpose a housing 38, and having an internal cavity 40 capable of accommodating the conical needle 2 of socket pliers, not shown.

It should be noted that, advantageously, the conical internal cavity 40 actually consists of a cavity including a narrowing 41 having a frustoconical surface favoring the coupling with the needle 2.

The insert 4 has a conical external wall 42, of the same coning angle as the cavity 36 in which it is inserted and, preferably, of the same coning angle as the needle 2.

In addition, the axial displacement of the insert 4 is restricted, on the opposite side of the jaws 32, by an elastic washer 39.

The insert 4 constitutes therefore an extension of the needle 2, capable of penetrating deeper into the end piece 33. Thus, in the embodiment shown, the recess 36 is larger and ends at the end of the end piece 33, so that, from the beginning of the expansion of the latter, the ends of the jaws 32 rest on the insert 4 that supports them, preventing therefore the bending of the jaws 32 that spread apart uniformly.

It should be noted that because of the presence of the insert 4, the recess 36 has more considerable transversal dimensions, i.e. that with equal external diameters the jaws 32 of the tool 3 are less thick and therefore less robust than the jaws 12 of the tool 1, which is however unimportant, because the jaws 32 do not have to be resistant to bending since they are supported over their full length by the insert 4.

The device according to the invention can thus allow to produce quality sockets in pipes made of plastic material with socket pliers of a classical type, even when said pipes are of a large diameter.

Thus, the user does not have to be concerned about knowing what pliers are adapted to the tool he has to use, or what device adapter he has to use with the chosen tool, it would be enough for him to take the tool adapted to the diameter of the pipe to be widened and to fix it on the one and only pair of pliers that he has, irrespective of said diameter.

Advantageously, each tool may include an insert having dimensional characteristics adapted to the diameter of the tool, in order to allow an optimal work.

I claim:

1. An expansion tool apparatus for pliers used for producing sockets at ends of a pipe, the apparatus comprising:
   a plurality of sector-shaped jaws movable between a first position in which said plurality of sector-shaped jaws define a cylindrical end piece and a second position in which said plurality of sector-shaped jaws are moved radially outwardly from said first position;
   a conical needle means axially insertable in a conical recess within said plurality of sector-shaped jaws for moving said plurality of sector-shaped jaws from said first position to said second position, said conical needle means suitable for being actuated by the pliers; and
   an insert axially movable between said plurality of sector-shaped jaws, said insert having a conical cavity at one end which is cooperative with said conical needle means, said insert having a conical form at an opposite end thereof, said conical form conforming to said conical recess, said conical form and said conical cavity being of substantially identical coning angles but of different diameters, said conical needle means for urging said insert axially in said conical recess of said plurality of sector-shaped jaws, said insert having a narrowing with a frustoconical surface formed at an end of said cavity opposite said one end of said insert, said frustoconical surface conforming to a portion of an external surface of said conical needle means.

2. The apparatus of claim 1, said end piece having a frustoconical shape.

3. The apparatus of claim 1, further comprising:
   a bushing holding said plurality of sector-shaped jaws, said plurality of sector-shaped jaws being mobile in radial displacement;
   a spring means affixed to said plurality of sector-shaped jaws and spring means for urging said plurality of sector-shaped jaws toward said first position, said insert being received and axially mobile within said bushing.

* * * * *